US010946774B2

(12) United States Patent
Kloosterman

(10) Patent No.: US 10,946,774 B2
(45) Date of Patent: Mar. 16, 2021

(54) ERGONOMIC INFANT SAFETY SEAT

(71) Applicant: Spring Design, LLC, Caldwell, ID (US)

(72) Inventor: Andrew Kloosterman, Caldwell, ID (US)

(73) Assignee: Spring Design, LLC, Caldwell, ID (US)

( * ) Notice: Subject to any disclaimer, the term of this patent is extended or adjusted under 35 U.S.C. 154(b) by 0 days.

(21) Appl. No.: 16/389,724

(22) Filed: Apr. 19, 2019

(65) Prior Publication Data
US 2019/0329677 A1    Oct. 31, 2019

Related U.S. Application Data

(60) Provisional application No. 62/663,812, filed on Apr. 27, 2018.

(51) Int. Cl.
*B60N 2/28* (2006.01)
*A45C 13/26* (2006.01)
*A47D 13/02* (2006.01)

(52) U.S. Cl.
CPC ............ *B60N 2/2845* (2013.01); *A45C 13/26* (2013.01); *A47D 13/025* (2013.01)

(58) Field of Classification Search
None
See application file for complete search history.

(56) References Cited

U.S. PATENT DOCUMENTS

| | | | |
|---|---|---|---|
| 5,207,476 A | 5/1993 | Payne | |
| 5,224,229 A * | 7/1993 | Smith | B60N 2/265 297/464 |
| 5,324,094 A | 6/1994 | Kain | |
| 5,516,190 A | 5/1996 | Kain et al. | |
| 5,544,935 A * | 8/1996 | Cone, II | A47D 13/02 16/430 |
| 5,651,581 A | 7/1997 | Myers et al. | |
| 5,658,044 A | 8/1997 | Krevh | |
| 5,775,770 A | 7/1998 | Tunney | |
| 5,806,924 A * | 9/1998 | Gonas | B60N 2/2821 297/216.11 |
| D402,124 S | 12/1998 | Haut et al. | |
| 6,017,088 A | 1/2000 | Stephens et al. | |
| 6,386,632 B1 * | 5/2002 | Goor | B60N 2/2806 297/183.2 |
| 6,428,099 B1 * | 8/2002 | Kain | B60N 2/2806 297/250.1 |

(Continued)

FOREIGN PATENT DOCUMENTS

DE    102013006729 A1    10/2014

*Primary Examiner* — David E Allred
(74) *Attorney, Agent, or Firm* — Holland & Hart LLP

(57) ABSTRACT

Infant car seats with improved handles and other features are described. An infant car seat and associated handle may collectively include multiple supports, including a lower support configured to engage a hand of a user and an upper support configured to engage an arm of the user. Examples of lower supports include an opening in a seat shell, a tubular member, or a hinged handle. Examples of upper support mays include a semicircular portion or a loop included in the handle and configured to at least partially encircle or otherwise engage an arm of the user. These and other features may increase the ease and comfort with which the user may carry the infant car seat.

16 Claims, 9 Drawing Sheets

(56) References Cited

U.S. PATENT DOCUMENTS

| | | | |
|---|---|---|---|
| 6,428,100 B1* | 8/2002 | Kain | B60N 2/2806 297/130 |
| 6,588,849 B2* | 7/2003 | Glover | A47D 13/02 297/250.1 |
| 6,626,489 B2 | 9/2003 | Geis et al. | |
| 6,913,313 B2 | 7/2005 | Sedlack | |
| 6,926,181 B1 | 8/2005 | Vath | |
| 6,976,685 B1* | 12/2005 | King | B60N 2/2806 280/30 |
| 7,506,921 B1* | 3/2009 | Sigmon, Jr. | B60N 2/2848 280/30 |
| 7,850,233 B2 | 12/2010 | Shafer et al. | |
| 8,998,312 B2 | 4/2015 | Sellers et al. | |
| 9,610,867 B2 | 4/2017 | Tew | |
| 10,531,748 B2* | 1/2020 | Walterspiel | A47D 7/002 |
| 2002/0043837 A1* | 4/2002 | Kain | B60N 2/2851 297/250.1 |
| 2002/0084680 A1* | 7/2002 | Kain | B60N 2/2863 297/256.13 |
| 2003/0151286 A1* | 8/2003 | Kain | B60N 2/2824 297/256.16 |
| 2004/0195283 A1* | 10/2004 | Zebraski | A47D 13/025 224/259 |
| 2004/0245822 A1* | 12/2004 | Balensiefer, II | B60N 2/2851 297/250.1 |
| 2005/0151402 A1* | 7/2005 | Balensiefer | B60N 2/2875 297/250.1 |
| 2006/0033365 A1* | 2/2006 | Aiudi | A45F 3/14 297/40 |
| 2007/0001495 A1* | 1/2007 | Boyle | B60N 2/2806 297/253 |
| 2009/0058153 A1* | 3/2009 | Shafer | A47D 13/02 297/183.2 |
| 2011/0115264 A1* | 5/2011 | Hei | B60N 2/2848 297/183.1 |
| 2012/0267924 A1* | 10/2012 | Chipman | A47D 13/025 297/183.2 |
| 2013/0082490 A1* | 4/2013 | Tew | A47D 13/02 297/183.6 |
| 2014/0008955 A1* | 1/2014 | Spence | B60N 2/2851 297/256.16 |
| 2016/0157632 A1 | 6/2016 | Nemerouf | |
| 2018/0050614 A1* | 2/2018 | Gay | B60N 2/2812 |
| 2019/0308530 A1* | 10/2019 | Lee | B60N 2/2845 |

\* cited by examiner

ERGONOMIC INFANT SAFETY SEAT

CROSS REFERENCES

The present Application for Patent claims priority to U.S. Provisional Patent Application No. 62/663,812 by Kloosterman, entitled "Infant Car Seat Carrying Method with Ergonomic Multi-Use Handle," filed Apr. 27, 2018, which is assigned to the assignee hereof and expressly incorporated herein by reference in its entirety.

BACKGROUND

The following relates generally to infant car seats and more specifically to infant car seats with improved handles and other features that make the infant car seats easier and more comfortable to carry.

In practice, the usage of infant car seats is not limited to in-vehicle usage. Rather, it is often necessary or desirable for parents and other users to carry infant car seats, often with an infant in the car seat. For example, infant car seats may be carried to and from a vehicle, to and from a stroller structure designed to accommodate the infant car seat, around stores or other venues, and in countless other situations. Some infant car seats may, however, be undesirably difficult or uncomfortable to carry, including while an infant is within the car seat.

SUMMARY

An improved ergonomic infant car seat in accordance with aspects of the present disclosure may include and be designed to be carried using at least two points of support. For example, an infant car seat may include one or more lower supports (handholds) each configured to engage a hand of a user and one or more upper supports (arm supports) each configured to simultaneously engage an arm of the user. Examples of handholds include but are not limited to openings in a seat shell (e.g., a base), tubular members (e.g., bars), and hinged handles. Examples of arm supports include but are not limited to semicircular members (e.g., hooks) or loops (e.g. openings) included in a handle and configured to at least partially encircle or otherwise engage an arm of the user while a handhold engages the hand of the user. In some cases, a handle may include two arm supports, each comprising a respective loop, which may be arranged in a "figure 8" or like configuration.

An infant safety seat is described. The infant safety seat may include a seat shell including a first sidewall and a second sidewall opposite to the first sidewall, the first sidewall including an opening configured to provide a handhold. The infant safety seat may further include a handle. The handle may include a first leg coupled with the first sidewall of the seat shell, a second leg coupled with the second sidewall of the seat shell, and a lateral portion coupled with the first leg and the second leg. The lateral portion may include an arm support configured to engage a straightened arm while the opening engages a hand of the straightened arm with a palm of the hand facing towards the user.

In some examples of the infant safety seat, the lateral portion of the handle may include a handgrip positioned between the first leg and the second leg.

In some examples of the infant safety seat, the lateral portion of the handle may further include a first loop and a second loop, the first loop including the arm support.

In some examples of the infant safety seat, the lateral portion of the handle may further include a member common to the first loop and the second loop, the member configured to provide handgrip that runs substantially parallel to the first sidewall and the second sidewall.

In some examples of the infant safety seat, at least of portion of an inner surface of the first loop may include a planar surface.

In some examples of the infant safety seat, the arm support may include a first semicircular portion that extends from a first point on the lateral portion of the handle, the first semicircular portion including a first termination that extends towards the second sidewall. The lateral portion of the handle may further include a second arm support, the second arm support including a second semicircular portion that extends from a second point on the lateral portion of the handle, the second semicircular portion including a second termination that extends towards the first sidewall.

In some examples of the infant safety seat, the arm support may extend from the first point towards a front portion of the seat shell, and the second arm support may extend from the second point towards a rear portion of the seat shell.

In some examples of the infant safety seat, the lateral portion of the handle may further include a handgrip positioned between the first end and the second end that runs substantially parallel to the first sidewall and the second sidewall.

In some examples of the infant safety seat, the arm support may extend from the first end of the lateral portion of the handle in a first direction, and the second arm support may extend from the second end of the lateral portion of the handle in the first direction.

In some examples of the infant safety seat, the lateral portion of the handle may further include a handgrip positioned between the first end and the second end that runs substantially perpendicular to the first sidewall and the second sidewall.

In some examples of the infant safety seat, the lateral portion may include a concave portion and a convex portion in series, the concave portion and the convex portion extending between the first leg and the second leg.

In some examples of the infant safety seat, the first sidewall may further include an additional opening located between the opening and the first leg, the additional opening configured to provide an additional handhold.

In some examples of the infant safety seat, the opening included in the first sidewall may be located nearer to a lower surface of the first sidewall than the first leg.

In some examples of the infant safety seat, an inner surface of the opening may be wider at a first location than at a second location, the first location above the second location.

Some examples of the infant safety seat may further include a tubular member extending between a first point on the first sidewall and a second point on the first sidewall, wherein the tubular member is configured to provide an additional handhold.

An infant safety seat is described. The infant safety seat may include a seat shell including a first sidewall and a second sidewall opposite to the first sidewall. The first sidewall may include a hinged handhold configured to fold out from the first sidewall. The infant safety seat may further include a handle. The handle may include a first leg coupled with the first sidewall of the seat shell, a second leg coupled with the second sidewall of the seat shell, and a lateral portion coupled with the first leg and the second leg, the lateral portion including an arm support configured to engage an arm while the hinged handhold engages a hand of the arm.

In some examples of the infant safety seat, the hinged handhold may be located on an inner surface of the first sidewall, the inner surface facing towards the second sidewall.

In some examples of the infant safety seat, the hinged handhold may be configured to be above a leg of an infant positioned in the seat shell when folded out from the first sidewall.

An infant safety seat is described. The infant safety seat may include a seat shell including a first sidewall and a second sidewall opposite to the first sidewall, the first sidewall including an opening configured to provide a handhold. The infant safety seat may further include a handle. The handle may include a first leg coupled with the first sidewall of the seat shell, a second leg coupled with the second sidewall of the seat shell, and a lateral portion coupled with the first leg and the second leg. The lateral portion may include a first loop and a second loop, and the first loop including an arm support configured to engage an arm while the opening engages a hand of the arm.

In some examples of the infant safety seat, the opening may be configured to engage a hand of the arm while the arm is straightened.

DETAILED DESCRIPTION

Figure 1A:
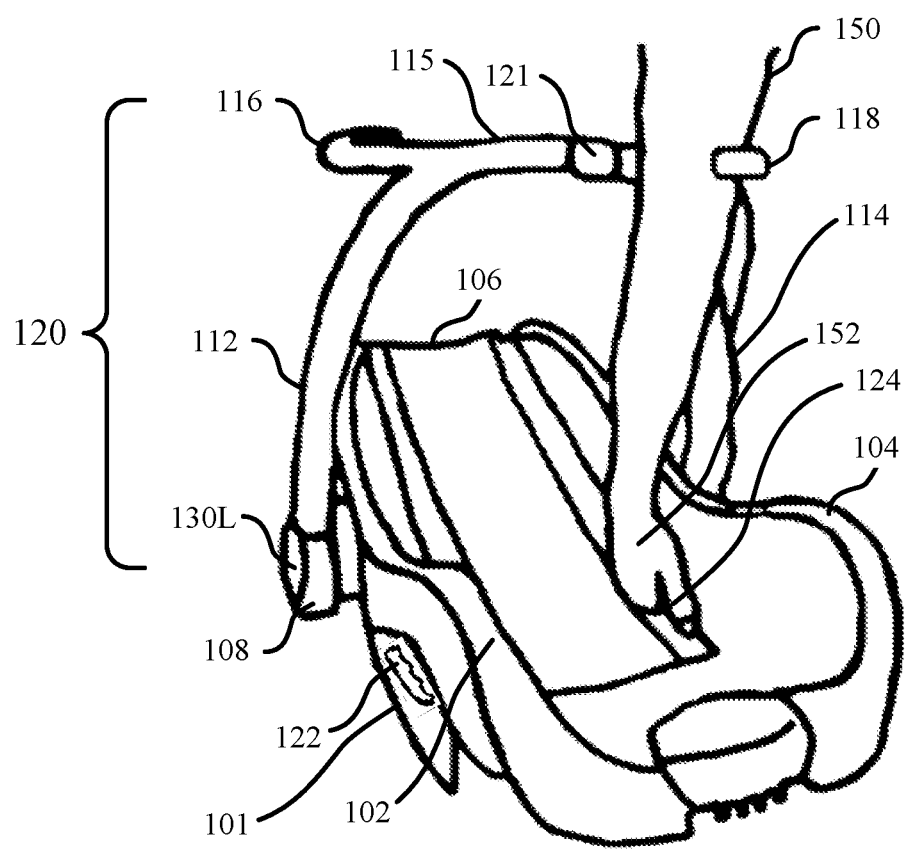
FIGS. 1A, 1B, 1C, and 1D illustrate an example of an infant car seat in accordance with aspects of the present disclosure.

Some infant car seats may be undesirably difficult or uncomfortable to carry, including while an infant is within the car seat. For example, some infant car seats may include a handle with a handgrip, but carrying the car seat by the handgrip may place the weight of the car seat undesirably low, may cause at least some aspects of the car seat to uncomfortably bump against a user's legs, may cause a user's arm to twist, or may otherwise cause discomfort and difficulty. Further, carrying such infant car seats higher on a user's body (e.g., by placing the handle in the crook of the user's arm or grabbing the base of the infant car seat with both hands) may place the weight of the car seat undesirably away from the user's body, which may increase the weight of the car seat as felt by the user, place the user in an uncomfortable position, or otherwise cause undesirable strain and discomfort for the user (e.g., on the user's shoulders, hips, or lower back). Such drawbacks may also result in disturbance or otherwise cause discomfort to an infant in the car seat (e.g., when the car seat bumps against a user's legs while being carried).

As described herein, an improved ergonomic infant car seat may include and be designed to be carried using at least two points of support. For example, an infant car seat may include one or more lower supports (handholds) each configured to engage a hand of a user and one or more upper supports (arm supports) each configured to simultaneously engage an arm of the user. Examples of handholds include but are not limited to openings in a seat shell (e.g., a base), tubular members (e.g., bars), and hinged handles. Examples of arm supports include but are not limited to semicircular members (e.g., hooks) or loops (e.g. openings) included in a handle and configured to at least partially encircle or otherwise engage an arm of the user while a handhold engages the hand of the user. In some cases, a handle may include two arm supports, each comprising a respective loop, which may be arranged in a "figure 8" or like configuration.

An infant car seat in accordance with the present disclosure may provide many advantages. For example, handholds may be integrated into or adjoined directly to a seat shell or base of the infant car seat, which may facilitate carrying the infant car seat close to a user's body, thereby making it feel lighter to carry and causing less strain on the user's body. This may also reduce a risk of handhold failure, increasing safety and durability. Additionally or alternatively, the placement of the handholds may be configured to raise the infant car seat when carried such that it rests against a user's hip rather than the user's knees or legs, which may increase comfort for the user and also result in decreased disturbance of an infant within the seat. Also, handholds as described herein may allow a user's hand to remain in a natural position (e.g., with the palm facing towards the user when the user's arm is straightened, as opposed to twisted or rotated), increasing comfort for the user.

Further, designing the infant car seat to be carried using multiple points of support as described herein may better distribute the weight of the infant car seat (e.g., between the user's hands, arms, hips, shoulders, and back). Also, designing the infant car seat to provide multiple points of support for carrying may increase a number of carrying options per side of the infant car seat, accommodating both right- and left-handed users and allowing users change positions (in addition to or independently of switching the side that is carried), which may allow a user to carry the seat for longer, more safely, more easily, and more comfortably. These and other benefits with be appreciated in light of the present disclosure.

Aspects of the disclosure are further illustrated by and described with reference to the following figures, which illustrate examples of infant car seats, including associated handles and other related features.

Figure 1B:
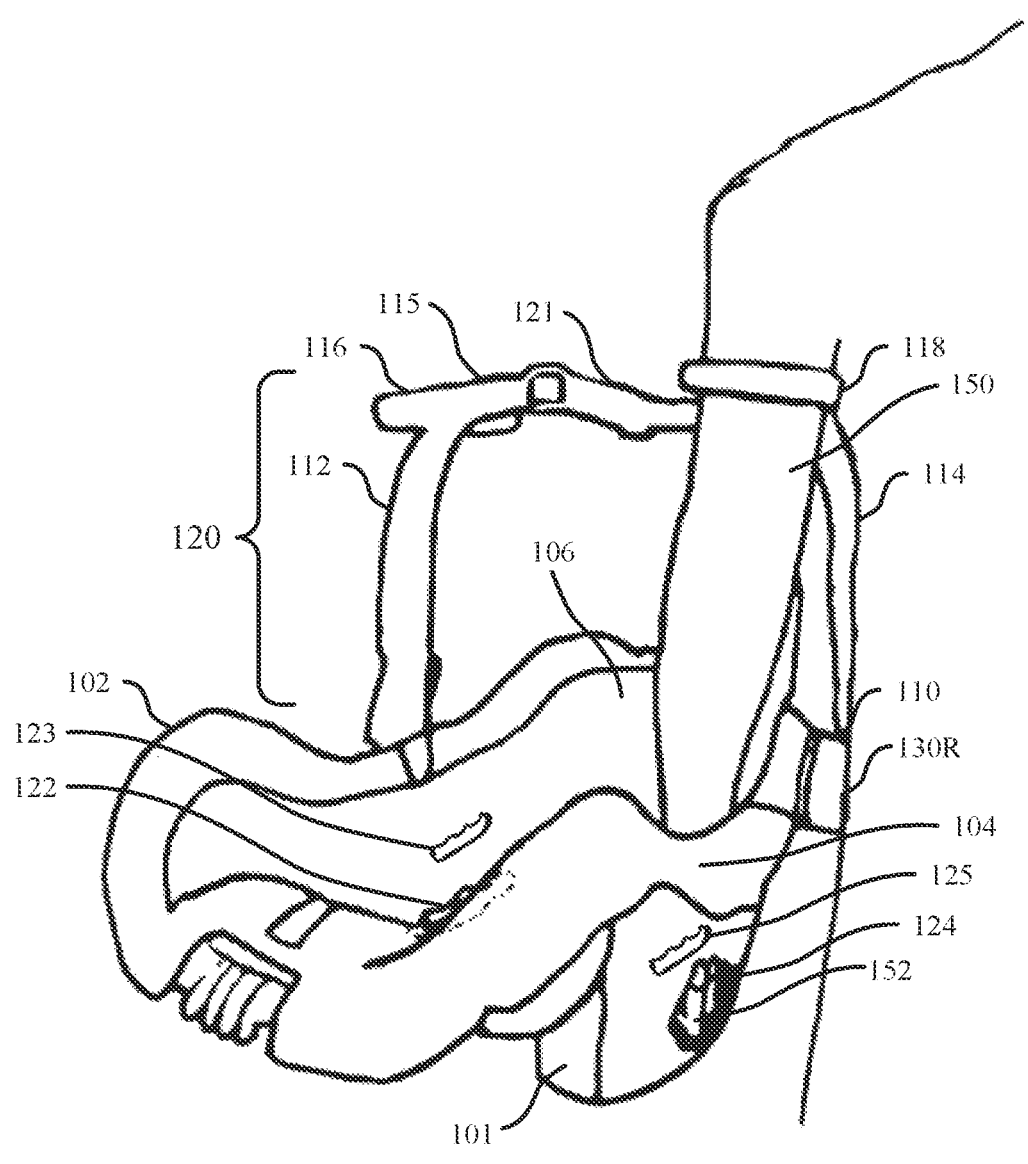
Figure 1C:
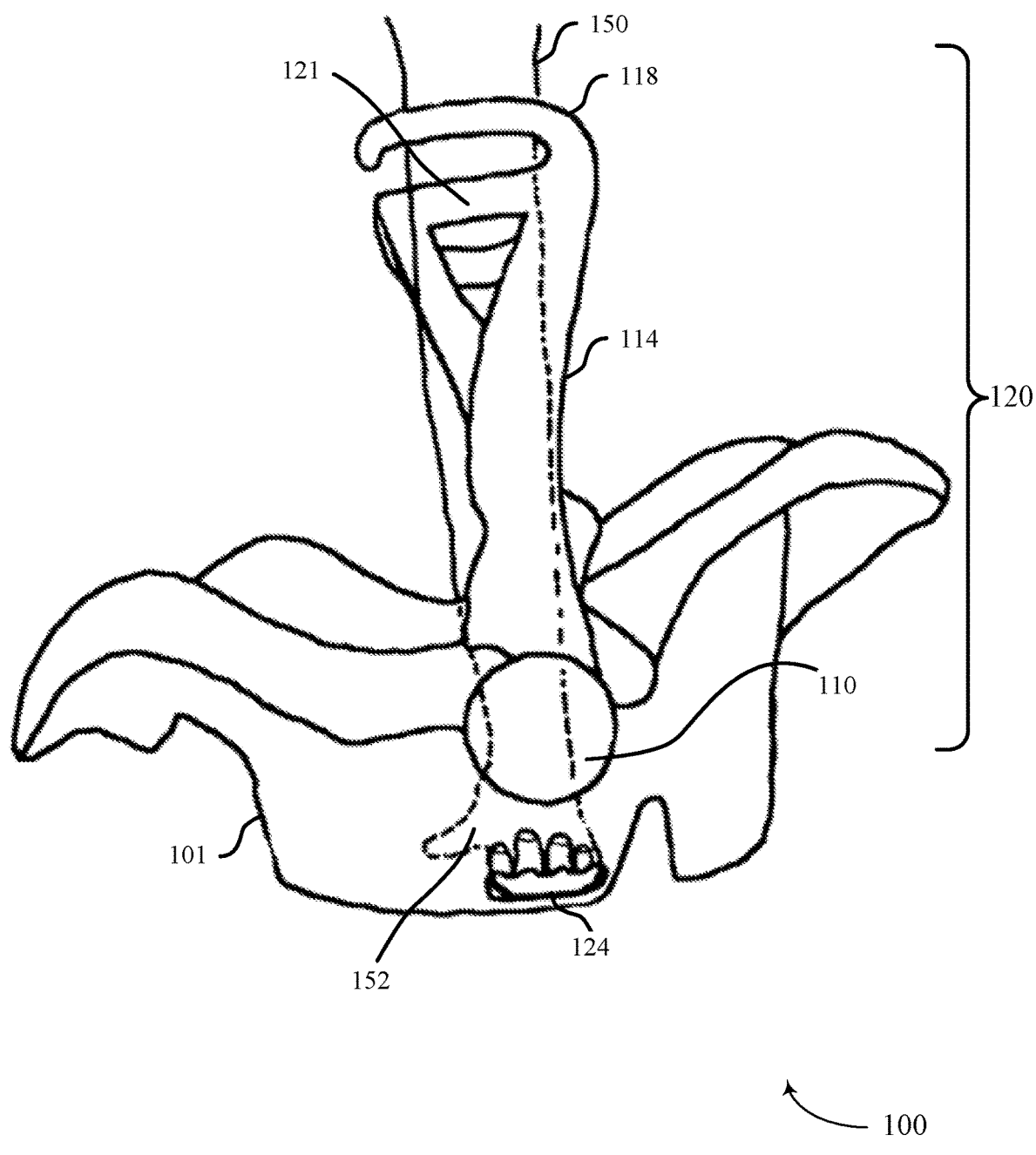
Figure 1D:
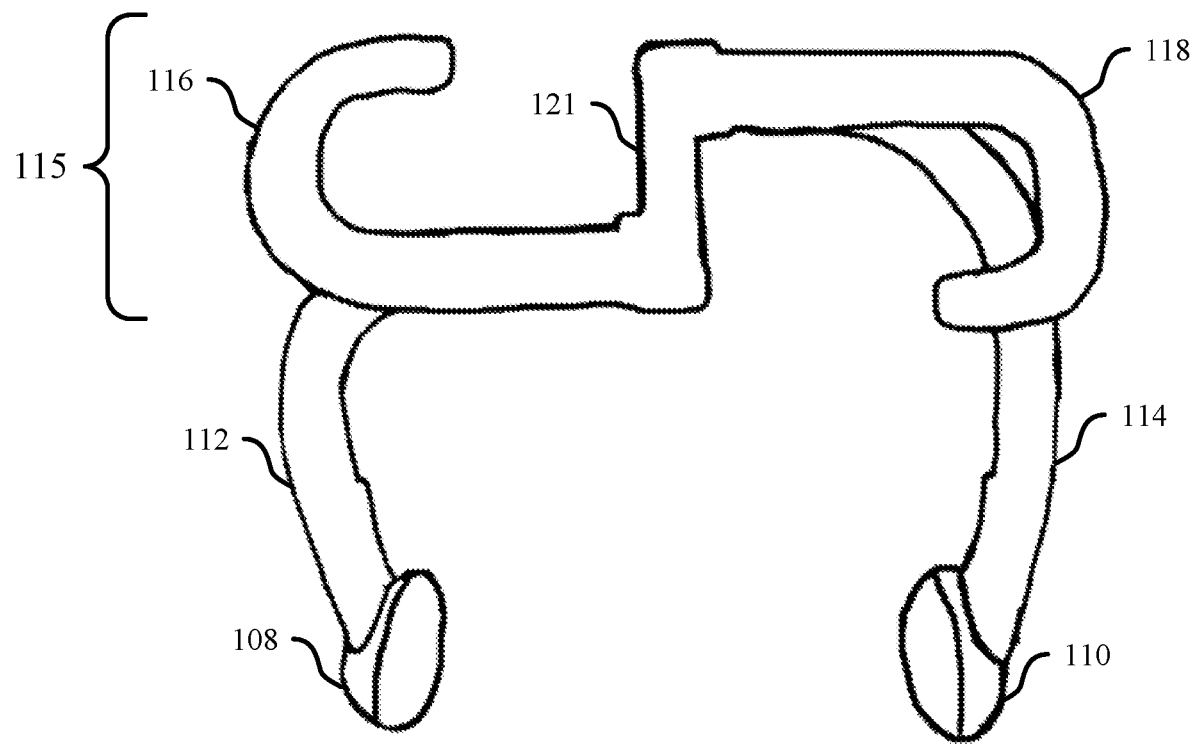

FIGS. 1A, 1B, 1C, and 1D illustrate an example of an infant car seat 100 in accordance with aspects of the present disclosure. FIG. 1A illustrates an example of the infant car seat 100 from a first (inside, front, rotated) perspective. FIG. 1B illustrates an example of the infant car seat 100 from a second (outside, side, rotated) perspective. FIG. 1C illustrates an example of the infant car seat 100 from a third (outside, side) perspective. FIG. 1D illustrates an example of a handle 120 for the infant car seat 100 from a top perspective.

The infant car seat 100 may include a seat shell 101 having a back 106, a first sidewall 102, and a second sidewall 104. The first sidewall and the second sidewall 104 may be opposite each other (e.g., with inner surfaces facing each other) and in some cases may be substantially parallel to one another. In some cases, the seat shell 101 may be a molded plastic shell, though it is to be understood that other materials and fabrication techniques may also be used. For example, though in the examples of FIGS. 1A, 1B, and 1C, the seat shell 101 is illustrated as a single (unitary, solid)

structure (piece, component), in some cases, one or more constituent parts (components) of seat shell 101 may be formed separately and joined with one or more constituent parts to form the seat shell 101.

The infant car seat 100 may include a handle 120. The handle 120 includes a first leg 112 and a second leg 114. The first leg 112 may be coupled to the first sidewall 102, and the second leg 114 may be coupled to the second sidewall 104. The first leg 112 and the second leg 114 may both extend upwardly, and in some cases inwardly (e.g., sloping towards the middle of the seat shell 101), from their respective sidewalls 102, 104.

In some cases, the handle 120 may be able to pivot forward and backwards (towards and away from the back 106, longitudinally along the sidewalls 102, 104). The first leg 112 and second leg 114 may, for example, be respectively coupled with the first sidewall 102 and second sidewall 104 by a first pivot point 108 and a second pivot point 110. In some cases, the length of the first leg 112 and the length of the second leg 114 may be adjustable. For example, the legs 112, 114 may each include two separate pieces that are adjustable vertically and lock together at different heights. Additionally or alternatively, each leg 112, 114 may include a sleeve (not shown) or like structure configured to allow the legs 112, 114 to have a length that is selectable (configurable) by a user. This may make the height of the handle 120 comfortable for users regardless of height or arm length.

The handle 120 may further include a lateral portion 115. The lateral portion 115 may be coupled with the first leg 112 and with the second leg 114. In some cases, the first leg 112 and the second leg 114 may extend in a substantially vertical direction relative to the seat shell 101, and the lateral portion 115 may extend in a substantially horizontal direction relative to the seat shell 101 (e.g., the lateral portion 115 may extend in a first direction that is substantially orthogonal to a second direction in which the first leg 112 and the second leg 114 each extend).

The lateral portion 115 may include a first arm support 116 and a second arm support 118. The first arm support 116 may extend from (be coupled with or adjoined to) a first point on (e.g., end of) the lateral portion 115, and the second arm support 118 may extend from (be coupled with or adjoined to) a second point on (e.g., end of) the lateral portion 115. For example, the first point may be nearer the first leg 112 than the second leg 114, and the second point may be nearer the second leg 114 than the first leg 112.

Each arm support 116, 118 may be or include a respective semicircular portion (member, hook) that extends away from the lateral portion 115. For both arm supports 116, 118, the respective semicircular portion may be configured to at least partially encircle, contact, provide support to, accommodate, or otherwise engage an arm 150 of a user (person carrying the infant car seat 100). In some cases, as shown in the examples of FIGS. 1A, 1B, 1C, and 1D, the first arm support 116 may extend away from the lateral portion 115 in a first direction and the second arm support 118 may extend away from the lateral portion 115 in a second direction that is different from the first direction. For example, the first arm support 116 may extend away from the lateral portion 115 towards the back 106 (towards a rear portion, away from a front portion of the seat shell 101), and may curve such that a termination of the respective (first) semicircular portion extends (points) towards the second sidewall 104. Conversely, the second arm support 118 may extend away from the lateral portion 115 and away from the back 106 (towards a front portion, away from a rear portion of the seat shell 101), and may curve such that a termination of the respective (second) semicircular portion extends (points) towards the first sidewall 102. The open half of the first arm support 116 and the open half of the second arm support 118 may both may face towards the inside (middle) of the infant car seat 100.

The arm supports 116, 118 may each include one or more features (have one or more attributes) to increase comfort for the user. For example, an inner curved surface of the each arm support 116, 118 (or other surface configured to contact the arm 150) may be flattened (planar) to decrease pressure on the arm 150. As another example, padding may be attached to any surface of an arm support 116, 118 configured to contact the arm 150.

The lateral portion 115 may further include a handgrip 121. The handgrip 121 may be configured to be gripped by, provide support to, accommodate, or otherwise engage a hand 152 of the user. The handgrip 121 may be posited between the first leg 112 and the second leg 114. For example, the handgrip 121 may be positioned between the first point and the second point on the lateral portion 115 from which the first arm support 116 and the second arm support 118 respectively extend. In some cases, the handgrip 121 may be centered between (equidistant to) the first sidewall 102 and the second sidewall 104.

As shown, for example, in FIG. 1D, the handgrip 121 may extend in a direction that runs substantially parallel to the first sidewall 102 and the second sidewall 104. For example, the lateral portion 115 may be jogged, an a first portion (section, side) of the lateral portion 115 may be nearer the back 106 than a second portion (section, side) of the lateral portion 115, with the first (more rearward, aft) portion of the lateral portion 115 coupled with the second arm support 118 and the second (more forward) portion of the lateral portion 115 coupled with the first arm support 116 (as shown in the example of FIG. 1D), or vice versa. Thus, a top of the first leg 112 may in some cases be more forward (further from the back 106) than a top of the second leg 114 (as shown in the example of FIG. 1C), or vice versa. In some cases, the first and second pivot points 108, 110 may be equidistant from the back 106, and the first leg 112 and second leg 114 may be angled forward and rearward respectively.

In some cases, handle 120 and aspects thereof may be formed of molded plastic, though it is to be understood that other materials and fabrication techniques may also be used. Further, though in the examples of FIGS. 1A, 1B, and 1C, the handle 120 is illustrated as a single (unitary, solid) structure (piece, component), in some cases, one or more constituent parts (components) of handle 120 may be formed separately and joined with one or more constituent parts to form the handle 120.

In addition to the arm supports 116, 118 and the handgrip 121, the infant car seat 100 may include one or more lower supports configured to be gripped by, provide a handhold to, provide support to, accommodate, or otherwise engage a hand 152 of the user. For example, as shown in the examples of FIGS. 1A, 1B, and 1C, the first sidewall 102 may include a first opening 122 and the second sidewall 104 may include a second opening 124 that are each configured to be gripped by, provide a handhold to, provide support to, or otherwise engage a hand 152 of the user. The second opening 124 may be configured to engage the hand 152 of the user while the second arm support 118 engages a straightened arm 150 of the user, with a palm of the hand 152 facing towards the user (away from the car seat 100, outward, towards an inner surface of the first sidewall 104, away from the second sidewall 102). This may improve the comfort and ease with which the user may carry the infant car seat 100, along with other benefits as discussed herein or as may be appreciated by one of ordinary skill in the art. In some cases, as shown in the examples, of FIGS. 1A, 1B, and 1C, the second opening 124 may be towards the bottom of the seat shell 101 (e.g., nearer a lower surface or bottom of the first sidewall 104 than the pivot point 110 or second leg 114), which may support (facilitate) engaging the hand 152 of the user while the arm 150 of the user is straightened and carrying the infant car seat 100 such that the pivot point 110 rests against the user's hip, rather than lower on the user's body.

The second opening 124 may include one or more features (have one or more attributes) to increase comfort for the user. For example, an inner (perimeter) surface of the second opening 124 may be wider at one point or location (e.g., at the top of the second opening 124) than at a second point or location (e.g., at the bottom of the second opening 124). The first sidewall 104 may be thicker at the top of the second opening 124 than at the bottom of the second opening 124. Additionally or alternatively, as another example, the top of the second opening 124 may be ridged or ribbed to conform to the fingers or other portions of the engaged hand 152. As another example, padding may be attached to any surface of the second opening 124 configured to contact the hand 152. The first opening 122 may include the same features as (e.g., be a mirror of) the second opening 124, but included in the first sidewall 102 and configured to similarly engage a hand of a user while the first arm support 116 engages a straightened arm of the user.

In some cases, the seat shell 101 may include any number of additional openings beyond the first opening 122 and the second opening 124. Additionally or alternatively, the seat shell 101 may include any number of additional other handholds, which 10 may be formed into the seat shell 101 (e.g., as a recess) or an added component (e.g., handgrip). Such additional openings or other lower supports may provide multiple options for the location of the user's hand 152, which may further support (facilitate) carrying the infant car seat 100 with a straightened arm 150 (e.g., in combination with or independent of one or more other features, such as the adjustability of the lengths of the legs 112, 114 or the pivotability of the handle 120). For example, the first sidewall 102 may include a first upper opening 123 located between the first opening 122 and the first leg 112 (first pivot point 108), and the second sidewall 104 may include a second upper opening 125 located between the second opening 124 and the second leg 114 (second pivot point 110).

A lower support point, such as an opening 122, 124, may allow the user's hand 152 to support at least a majority of the weight of the infant car seat 100. Lifting the corresponding sidewall 102, 104 may cause rotational force away from the user's body, but this may be countered by the corresponding arm support 116, 118 engaging the user's arm 150. Thus, the infant car seat 100 may remain substantially level with the ground. Further, the weight or other force associated with carrying the infant car seat 100 may be distributed across at least two support points, increasing ease and comfort for the user.

When carried by the first opening 122 and first arm support 116, the first pivot point 108 may rest against a hip (e.g., left hip) of the user. Likewise, when carried by the second opening 124 and second arm support 118, the second pivot point 110 may rest against a hip (e.g., right hip) of the user. Thus, in some cases, a first cushioning pad 130L may be attached to the first pivot point 108, and a second cushioning pad 130R may be attached to the second pivot point 110, which may further increase ease and comfort for the user.

Figure 2:
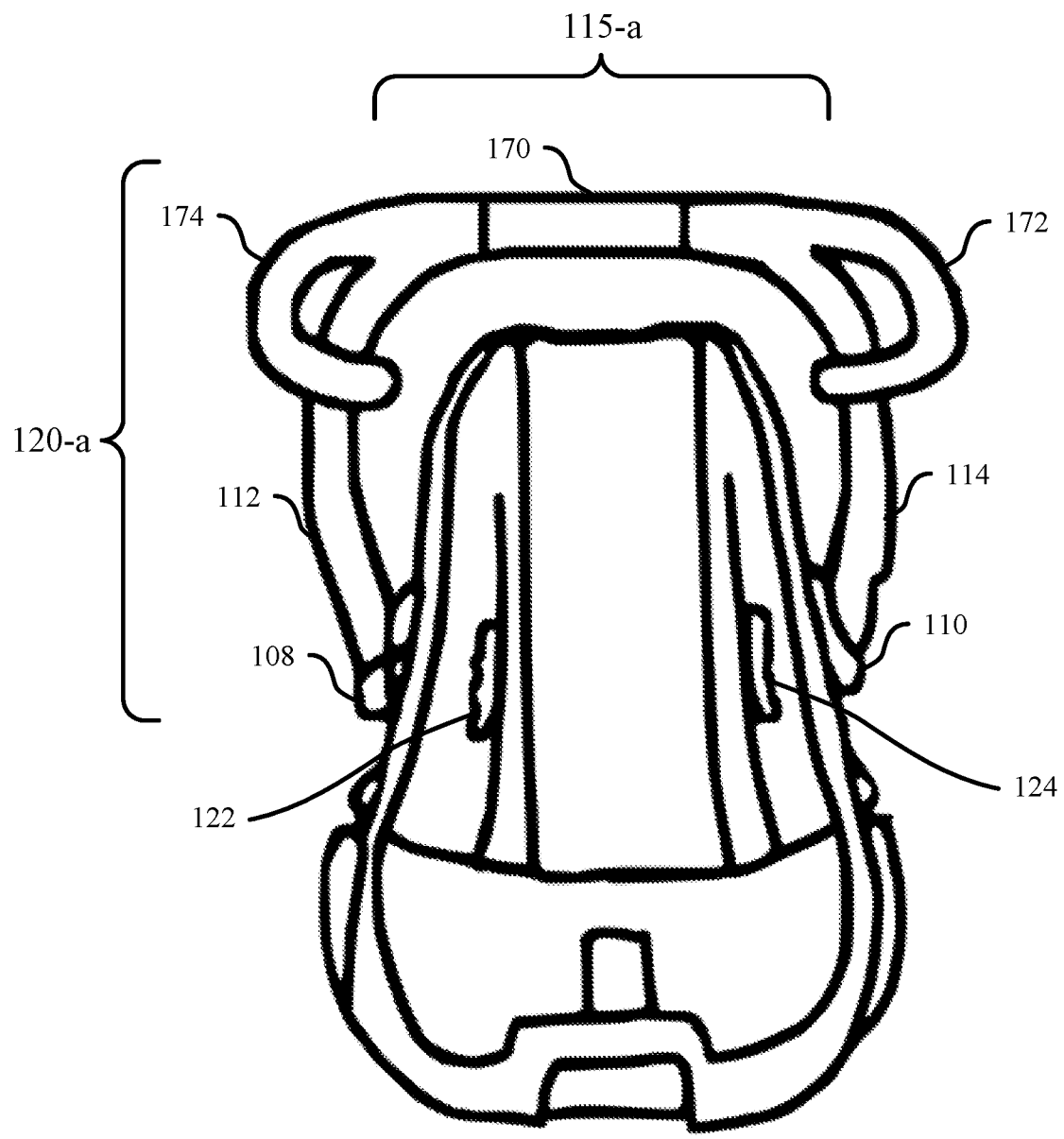
FIG. 2 illustrates an example of an infant car seat in accordance with aspects of the present disclosure.

FIG. 2 illustrates an example of a handle 120-*a* for an infant car seat accordance with aspects of the present disclosure. In some cases, the handle 120-*a* may be included in an infant car seat 100 as described herein (e.g., may be coupled with seat shell 101 as described herein).

The handle 120-*a* may be an example of a handle 120 as described herein. For example, the handle 120-*a* may include a first pivot point 108, second pivot point 110, first leg 112, and second leg 114, which may be examples of and have one or more features of the corresponding components and features described herein.

The handle 120-*a* may include a lateral portion 115-*a*. The lateral portion 115-*a* may include a first arm support 174 and a second arm support 172. The first arm support 174 may extend from (be coupled with or adjoined to) a first point on (e.g., end of) the lateral portion 115-*a*, and the second arm support 172 may extend from (be coupled with or adjoined to) a second point on (e.g., end of) the lateral portion 115-*a*. For example, the first point may be nearer the first leg 112 than the second leg 114, and the second point may be nearer the second leg 114 than the first leg 112.

Each arm support 172, 174 may include a respective semicircular portion (member, hook) that extends away from the lateral portion 115-*a*. For both arm supports 172, 174, the respective semicircular portion may be configured to at least partially encircle, contact, provide support to, accommodate, or otherwise engage an arm 150 (not shown) of a user (person carrying the infant car seat 100). In some cases, as shown in the example of FIG. 2, the first arm support 174 may extend away from the lateral portion 115-*a* in a first direction and the second arm support 172 may also extend away from the lateral portion 115-*a* in the first (same) direction. For example, the first arm support 174 and the second arm support 172 may both extend away from the lateral portion 115-*a* away from the back 106 (towards a front portion, away from a rear portion of the seat shell 101). Alternatively, the first arm support 174 and the second arm support 172 may both extend away from the lateral portion 115-*a* towards the back 106 (towards a rear portion, away from a front portion of the seat shell 101). The first arm support 174 may curve such that a termination of the respective (first) semicircular portion extends (points) towards the second sidewall 104. The second arm support 172 may curve such that a termination of the respective (second) semicircular portion extends (points) towards the first sidewall 102. The open half of the first arm support 174 and the open half of the second arm support 172 may both may face towards the inside (middle) of the infant car seat 100.

The arm supports 172, 174 may each include one or more features (have one or more attributes) to increase comfort for the user. For example, an inner curved surface of the each arm support 172, 174 (or other surface configured to contact the arm 150) may be flattened (planar) to decrease pressure on the arm 150. As another example, padding may be attached to any surface of an arm support 172, 174 configured to contact the arm 150.

The lateral portion 115-*a* may further include a handgrip 170. The handgrip 170 may be configured to be gripped by, provide support to, accommodate, or otherwise engage a hand 152 of the user. The handgrip 170 may be posited between the first leg 112 and the second leg 114. For example, the handgrip 170 may be positioned between the first point and the second point on the lateral portion 115-*a* from which the first arm support 172 and the second arm support 174 respectively extend. In some cases, the handgrip 170 may be centered between (equidistant to) the first sidewall 102 and the second sidewall 104.

As shown, for example, in FIG. 2, the handgrip 170 may extend in a direction that runs substantially perpendicular to (e.g., substantially orthogonal to a planar surface of) the first sidewall 102 and the second sidewall 104.

In some cases, handle 120-a and aspects thereof may be formed of molded plastic, though it is to be understood that other materials and fabrication techniques may also be used. Further, though in the example of FIG. 2 the handle 120-a is illustrated as a single (unitary, solid) structure (piece, component), in some cases, one or more constituent parts (components) of handle 120-a may be formed separately and joined with one or more constituent parts to form the handle 120-a.

Figure 3:
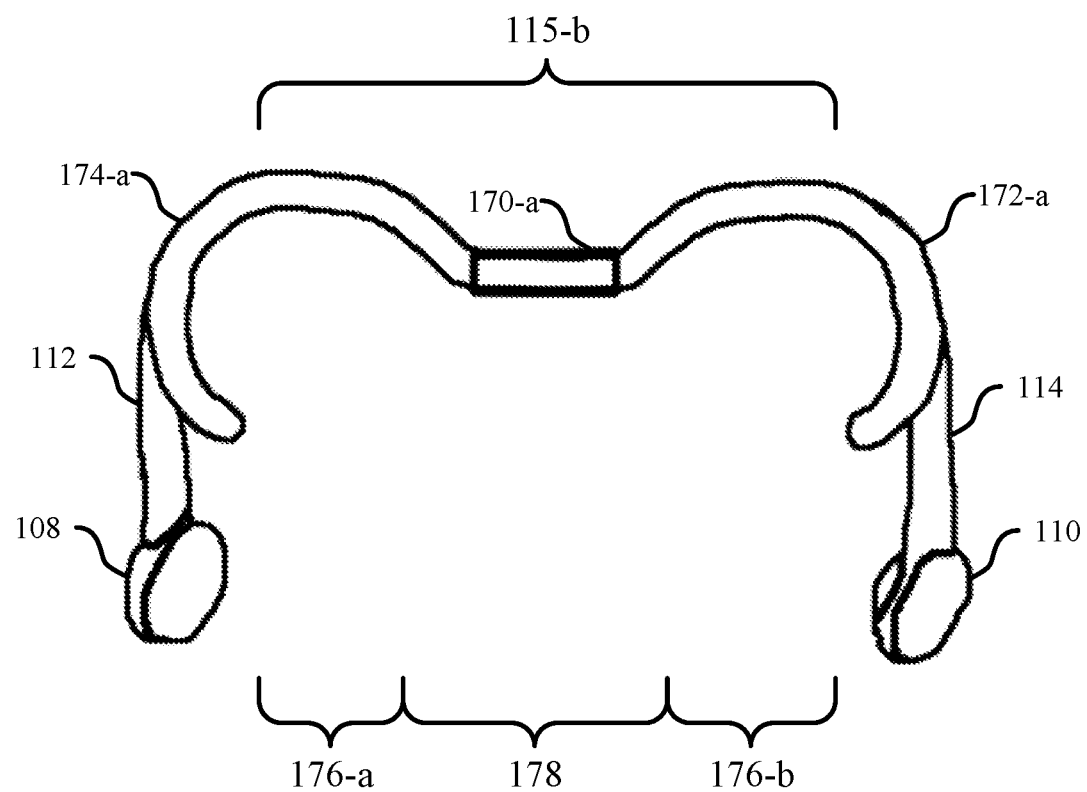
FIG. 3 illustrates an example of a handle for an infant car seat in accordance with aspects of the present disclosure.

FIG. 3. illustrates an example of a handle 120-b for an infant car seat accordance with aspects of the present disclosure. In some cases, the handle 120-b may be included in an infant car seat 100 as described herein (e.g., may be coupled with seat shell 101 as described herein).

The handle 120-b may be an example of a handle 120 as described herein. For example, the handle 120-b may include a first pivot point 108, second pivot point 110, first leg 112, and second leg 114, which may be examples of and have one or more features of the corresponding components and features described herein.

The handle 120-b may include a lateral portion 115-b. The lateral portion 115-b may include a first arm support 174-a and a second arm support 172-a. The first arm support 174-a may extend from (be coupled with or adjoined to) a first point on (e.g., end of) the lateral portion 115-b, and the second arm support 172-a may extend from (be coupled with or adjoined to) a second point on (e.g., end of) the lateral portion 115-b. For example, the first point may be nearer the first leg 112 than the second leg 114, and the second point may be nearer the second leg 114 than the first leg 112.

Each arm support 172-a, 174-a may include a respective semicircular portion (member, hook) that extends away from the lateral portion 115-b. For both arm supports 172-a, 174-a, the respective semicircular portion may be configured to at least partially encircle, contact, provide support to, accommodate, or otherwise engage an arm 150 (not shown) of a user (person carrying the infant car seat 100). In some cases, as shown in the example of FIG. 3, the first arm support 174-a may extend away from the lateral portion 115-b in a first direction and the second arm support 172-a may also extend away from the lateral portion 115-b in the first (same) direction. For example, the first arm support 174-a and the second arm support 172-a may both extend away from the lateral portion 115-b away from the back 106 (towards a front portion, away from a rear portion of the seat shell 101). Alternatively, the first arm support 174-a and the second arm support 172-a may both extend away from the lateral portion 115-b towards the back 106 (towards a rear portion, away from a front portion of the seat shell 101). The first arm support 174-a may curve such that a termination of the respective (first) semicircular portion extends (points) towards the second sidewall 104. The second arm support 172-a may curve such that a termination of the respective (second) semicircular portion extends (points) towards the first sidewall 102. The open half of the first arm support 174-a and the open half of the second arm support 172-a may both may face towards the inside (middle) of the infant car seat 100.

The arm supports 172-a, 174-a may each include one or more features (have one or more attributes) to increase comfort for the user. For example, an inner curved surface of the each arm support 172-a, 174-a (or other surface configured to contact the arm 150) may be flattened (planar) to decrease pressure on the arm 150. As another example, padding may be attached to any surface of an arm support 172-a, 174-a configured to contact the arm 150.

The lateral portion 115-b may further include a handgrip 170-a. The handgrip 170-a may be configured to be gripped by, provide support to, accommodate, or otherwise engage a hand 152 of the user. The handgrip 170-a may be posited between the first leg 112 and the second leg 114. For example, the handgrip 170-a may be positioned between the first point and the second point on the lateral portion 115-b from which the first arm support 172-a and the second arm support 174-a respectively extend. In some cases, the handgrip 170-a may be centered between (equidistant to) the first sidewall 102 and the second sidewall 104.

As shown, for example, in FIG. 3, the handgrip 170-a may extend in a direction that runs substantially perpendicular to (e.g., substantially orthogonal to a planar surface of) the first sidewall 102 and the second sidewall 104.

As also shown, for example, in FIG. 3, the lateral portion 115-b may be wavy (e.g., moustache-shaped) when viewed from a top perspective. For example, from the perspective of the front of an infant car seat 100, the lateral portion 115-b may include a first concave portion 176-a in series with a convex portion 178 and with a second concave portion 176-b (from the perspective of the rear of the infant car seat 100, which portion(s) are concave versus convex may be reversed). The convex portion 178 may include the handgrip 170-a, which may be nearer the front of the infant car seat 100 than a rearmost portion of the first concave portion 176-a and a rearmost portion of the second concave portion 176-b. That is, the concave portions 176 may comprise curved portions that angle away from the handgrip 170-a towards a rear of the infant car seat 101 such that the arm supports 172-a, 174-a each extend from a point that is behind (nearer the rear of the infant car seat 101 than) the handgrip 170-a.

In some cases, handle 120-b and aspects thereof may be formed of molded plastic, though it is to be understood that other materials and fabrication techniques may also be used. Further, though in the example of FIG. 3 the handle 120-b is illustrated as a single (unitary, solid) structure (piece, component), in some cases, one or more constituent parts (components) of handle 120-b may be formed separately and joined with one or more constituent parts to form the handle 120-b.

Figure 4A:
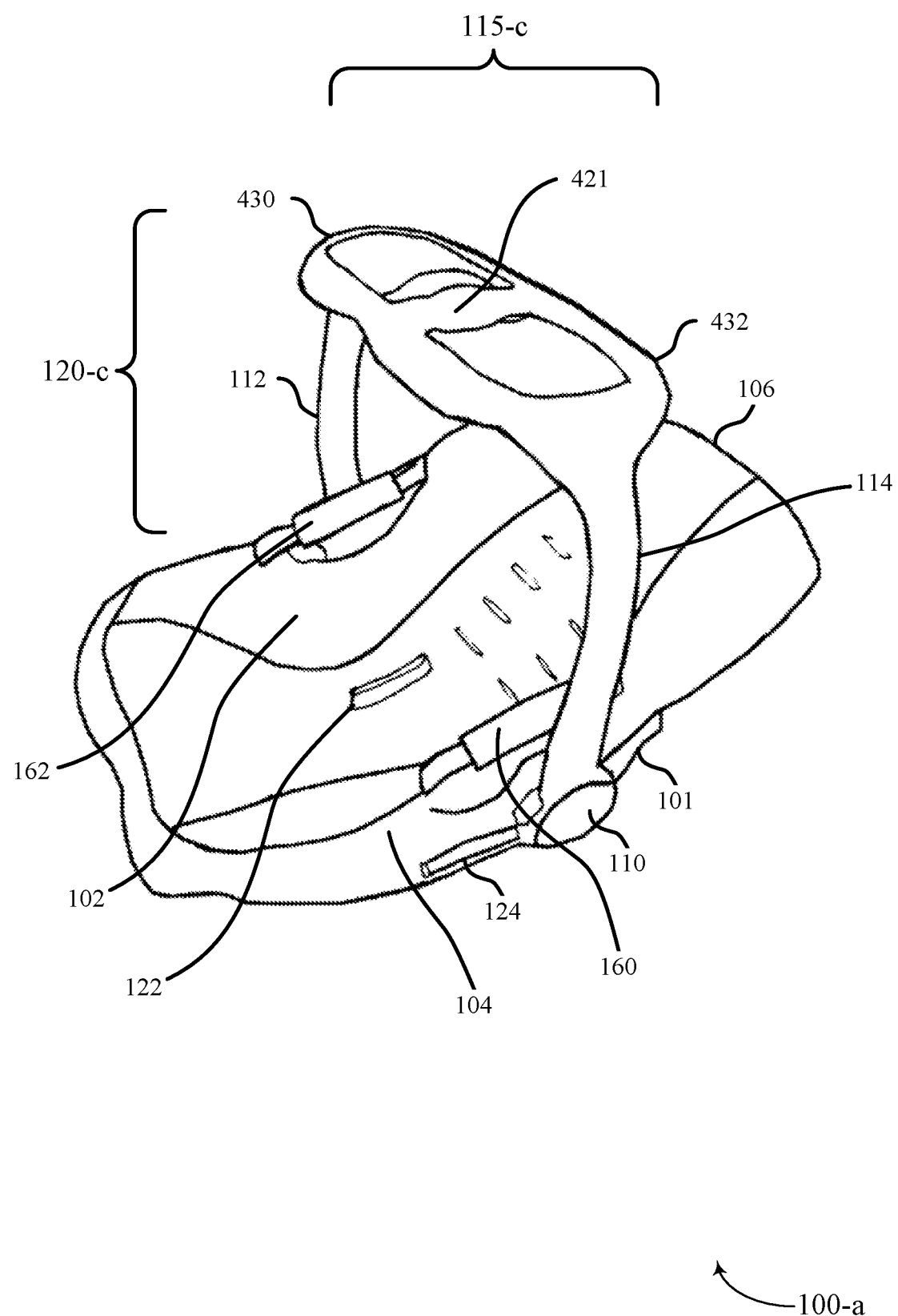
FIGS. 4A and 4B illustrate an example of an infant car seat in accordance with aspects of the present disclosure.
Figure 4B:
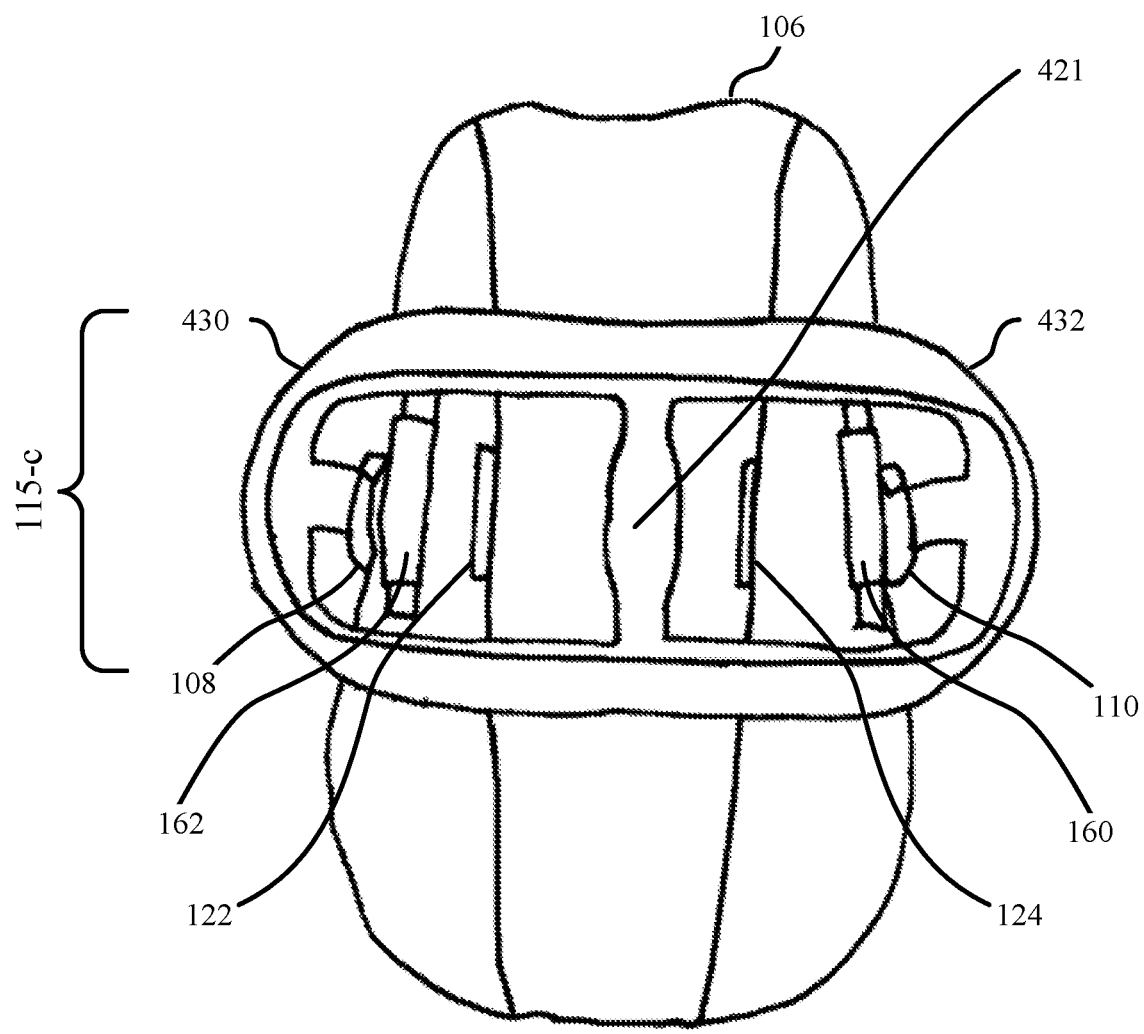

FIGS. 4A and 4B illustrate an example of an infant car seat 100-a in accordance with aspects of the present disclosure. FIG. 4A illustrates an example of the infant car seat 100-a from a first (outside, side, rotated) perspective. FIG. 4B illustrates an example of the infant car seat 100-a from a second (top) perspective.

In some cases, the infant car seat 100-a may have one or more features of car seat 100 as described herein. For example, the infant car seat 100-a may include a seat shell 101, which may include a first sidewall 102, a second sidewall 104, and a back 106. The first sidewall 102 may include a first opening 122, and the second sidewall 104 may include a second opening 124.

In some cases, infant car seat 100-a may include a handle 120-c, which may have one or more features of handle 120 as described herein. For example, the handle 120-c may include a first pivot point 108, second pivot point 110, a first leg 112, and a second leg 114.

The handle 120 may further include a lateral portion 115-c. The lateral portion 115-c may be coupled with the first leg 112 and with the second leg 114. In some cases, the first leg 112 and the second leg 114 may extend in a substantially vertical direction relative to the seat shell 101, and the lateral portion 115-c may extend in a substantially horizontal direction relative to the seat shell 101 (e.g., the lateral portion 115-c may extend in a first direction that is substantially orthogonal to a second direction in which the first leg 112 and the second leg 114 each extend).

The lateral portion 115-c may include a first arm support 430 and a second arm support 432. Each arm support 430, 432 may be or include a respective loop (e.g., an opening in the lateral portion 115-c), which may be configured to encircle, surround, contact, provide support to, accommodate, or otherwise engage an arm of a user (person carrying the infant car seat 100). For example, the arm may pass through one of the first arm support 430 or the second arm support 432. In some cases, the first arm support 430 (e.g., first loop) and the second arm support 432 (e.g., second loop) may form or be referred to as being in a "figure 8" configuration. The arm supports 430, 432 may each include one or more features (have one or more attributes) to increase comfort for the user. For example, as shown in FIG. 4B, an inner surface of the each arm support 430, 432 (or other surface configured to contact the arm) may be flattened (planar) to decrease pressure on the arm. As another example, padding may be attached to any surface of an arm support 430, 432 configured to contact the arm.

In some cases, the second opening 124 may be configured to engage a hand of the user while the second arm support 432 engages a straightened arm of the user, with a palm of the hand facing towards the user (away from the car seat 100-a, outward, towards an inner surface of the first sidewall 104, away from the second sidewall 102). Likewise, the first opening 122 may be configured to engage a hand of the user while the second arm support 432 engages a straightened arm of the user, with a palm of the hand facing towards the user (away from the car seat 100-a, outward, towards an inner surface of the second sidewall 102, away from the second sidewall 104). This may improve the comfort and ease with which the user may carry the infant car seat 100-a. For example, as described herein, a lower support point, such as an opening 122, 124, may allow the user's hand to support at least a majority of the weight of the infant car seat 100-a. Lifting the corresponding sidewall 102, 104 may cause rotational force away from the user's body, but this may be countered by the corresponding arm support 430, 432 engaging the user's arm. Thus, the infant car seat 100-a may remain substantially level with the ground. Further, the weight or other force associated with carrying the infant car seat 100 may be distributed across at least two support points, increasing ease and comfort for the user.

The lateral portion 115-c may further include a handgrip 421. The handgrip 421 may be configured to be gripped by, provide support to, accommodate, or otherwise engage a hand of the user. The handgrip 421 may be posited between the first leg 112 and the second leg 114. For example, the handgrip 421 may be positioned between the first arm support 430 and the second arm support 432. In some cases, as shown in the example of FIG. 4, the handgrip 421 may comprise a member (e.g., tubular member, bar) common to the first arm support 430 and the second arm support 432, such as a member that forms part of the first loop and part of the second loop (e.g. the handgrip 421 may form a middle portion of the "figure 8"). In some cases, the handgrip 421 may be centered between (equidistant to) the first sidewall 102 and the second sidewall 104. Also, as shown, for example, in FIG. 4, the handgrip 421 may extend in a direction that runs substantially parallel to the first sidewall 102 and the second sidewall 104.

In some cases, handle 120-c and aspects thereof may be formed of molded plastic, though it is to be understood that other materials and fabrication techniques may also be used. Further, though in the examples of FIG. 4, the handle 120-c is illustrated as a single (unitary, solid) structure (piece, component), in some cases, one or more constituent parts (components) of handle 120-c may be formed separately and joined with one or more constituent parts to form the handle 120-c.

As shown in FIGS. 4A and 4B, the infant car seat 100-a may include lower supports in addition to or in the alternative to openings (e.g., in addition to or in the alternative to the first opening 122 and the second opening 124). For example, in some cases, the infant car seat 100 may include a first tubular (cylindrical) member 162 and a second tubular (cylindrical) member 160, each configured to be gripped by, provide a handhold to, provide support to, accommodate, or otherwise engage a hand of the user (e.g., while the user's arm is straightened). The tubular members 160, 162 may be molded into the seat shell 101 or attached to seat shell 101 (e.g., as bars). The first tubular member 162 may extend from a first point on the first sidewall 102 to a second point on the first sidewall 102 (e.g., from a first point on top of the first sidewall 102 to a second point on top of the first sidewall 102). Likewise, the second tubular member 160 may extend from a first point on the second sidewall 104 to a second point on the second sidewall 104 (e.g., from a first point on top of the second sidewall 104 to a second point on top of the second sidewall 104). The tubular members 160, 162 may be shaped to conform to a user's fingers or other aspects of the user's hand. Further, like any openings such as the first and second openings 122, 124, the tubular members 160, 162 may be positioned relative to the arm supports 116, 118 so as to engage the user's hand with the palm facing towards the user and the user's arm straightened, increasing ease and comfort for the user.

Figure 5:
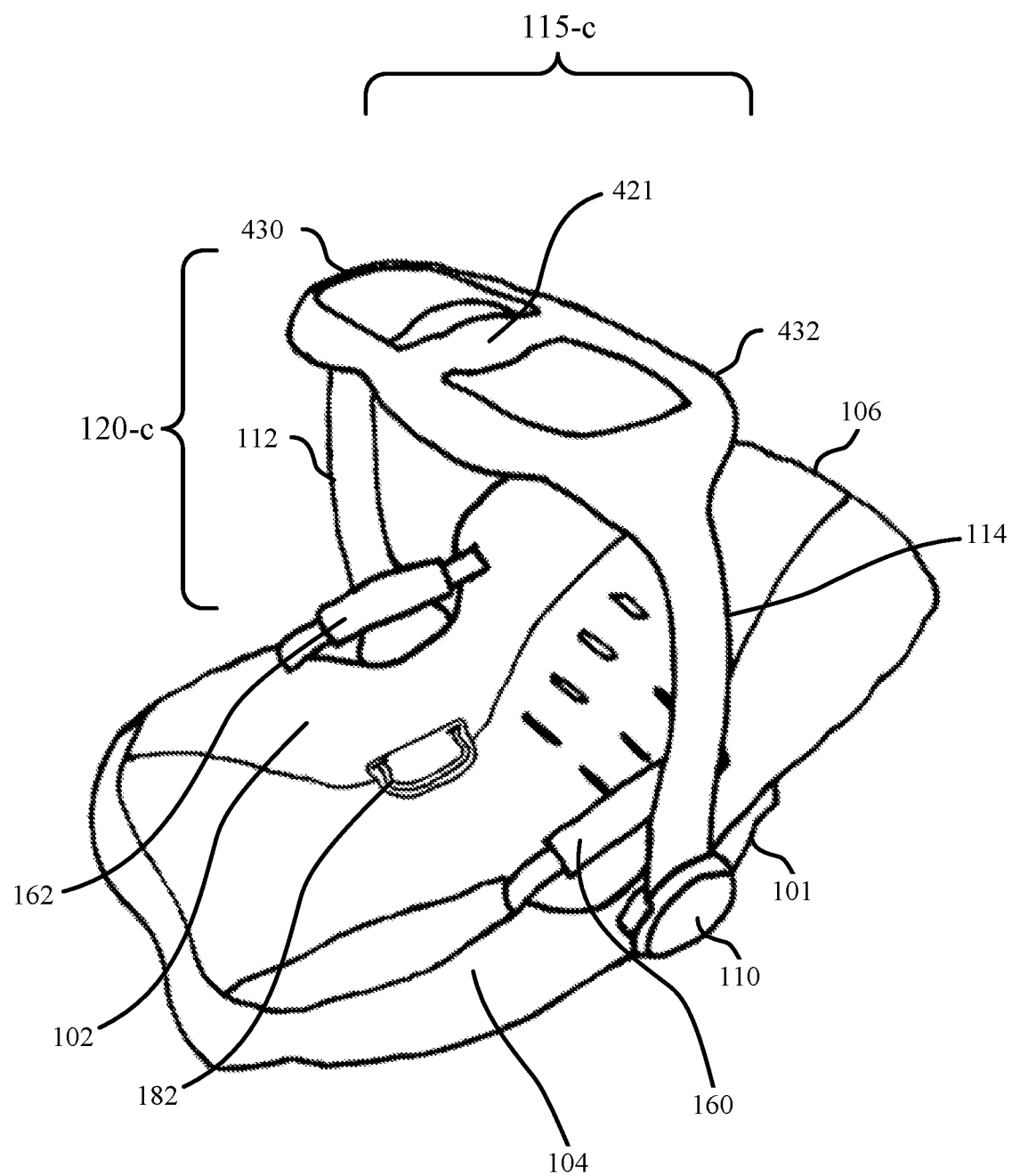
FIG. 5 illustrates an example of an infant car seat in accordance with aspects of the present disclosure.

FIG. 5 illustrates an example of an infant car seat 100-b in accordance with aspects of the present disclosure. In some cases, the infant car seat 100-b may have one or more features of car seats 100, 100-a as described herein. For example, the infant car seat 100-b may include a seat shell 101, which may include a first sidewall 102, a second sidewall 104, and a back 106. Infant car seat 100-b may also include a handle 120-c, which may include a first pivot point 108, second pivot point 110, a first leg 112, a second leg 114, and a lateral portion 115-c. The lateral portion 115-c may include a first arm support 430 and a second arm support 432, along with a handgrip 421.

As shown in FIG. 5, the infant car seat 100-b may include lower supports in addition to or in the alternative to one or more openings (e.g., in addition to or in the alternative to a first opening 122 and a second opening 124). For example, the infant car seat 100 may include a first tubular (cylindrical) member 162 and a second tubular (cylindrical) member 160.

Additionally or alternatively, the infant car seat 100-b may include a hinged handhold 182, which may also be a lower support. The hinged handhold 182 may be configured to be gripped by, provide a handhold to, provide support to, accommodate, or otherwise engage a hand of the user (e.g., while the user's arm is straightened and engaged by the first arm support 430). For example, the hinged handhold 182 may be or include a curved member configured to at least partially encircle or otherwise be gripped by the hand of the user, and the curved member may be configured to rotate upon a hinge or axis (e.g., away from the first sidewall 102 when engaging the hand of the user, and toward the first sidewall 102 when not engaging the hand of the user). The hinged handhold 182 may also include or be coupled with the inner surface of the first sidewall 102 by a hinge configured to support rotation of the hinged handhold 182. In some cases, hinged handhold 182 may also include a spring configured to return the hinged handhold 182 to a folded-in position when not engaging the hand of the user.

The hinged handhold 182 may be located (e.g., coupled with, adjoined to, mounted to) an inner surface of the first sidewall 102, the inner surface of the first sidewall 102 facing towards an inner surface of the second sidewall 104. In some cases, the hinged handhold 182 may be configured to rest against (be folded into or against) the inner surface of the first sidewall 102 when not engaging the hand of the user and may be configured to be pulled away (folded out) from the inner surface of the first sidewall 102 (e.g., rotated upwards, in a counterclockwise direction) when engaging the hand of the user. The hinged handhold 182 may be located so as to be above a leg of an infant positioned in the infant car seat 100-b when folded out from the first sidewall 102. The hinged handhold 182 may be located to be at least partially beside the leg of the infant when folded in (against the inner surface of the first sidewall 102). In some cases, when folded in, the hinged handhold 182 may be flush (coplanar) with the inner surface of the first sidewall 102—e.g., as facilitated by a recess in the inner surface of the first sidewall 102. Further, the hinged handhold 182 may be positioned relative to the first arm support 430 so as to engage the user's hand with the palm facing towards the user and the user's arm straightened, increasing ease and comfort for the user.

The hinged handhold 182 may include one or more features (have one or more attributes) to increase comfort for the user. For example, one or more surfaces of the hinged handhold 182 may be ridged or ribbed to conform to the fingers or other portions of the engaged hand. As another example, padding may be attached to any surface of hinged handhold 182 configured to contact the hand of the user.

Further, the infant car seat 100-b may include a second hinged handhold (not shown), which may include the same features as (e.g., be a mirror of) the hinged handhold 182, but may be located on an inner surface of the second sidewall 104 and configured to similarly engage a hand of a user while the second arm support 432 engages a straightened arm of the user.

It should be noted that the features, components, and apparatuses described herein describe possible implementations, and that the features, components, and apparatuses may be rearranged or otherwise modified and that other implementations are possible. Further, aspects from any two or more of the examples described herein may be recombined in any combination.

It should also be noted that the features, components, and apparatuses described herein are not limited to any particular material or set of dimensions.

As used herein, the term "substantially" means that the modified characteristic (e.g., a verb or adjective modified by the term substantially) need not be absolute but is close enough to achieve the advantages of the characteristic.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. An infant safety seat, comprising:
    a seat shell comprising a first sidewall and a second sidewall opposite to the first sidewall, the first sidewall including an opening configured to provide a handhold; and
    a handle comprising:
        a first leg coupled with the first sidewall of the seat shell and a second leg coupled with the second sidewall of the seat shell; and
        a lateral portion defined by a first closed loop coupled directly to an upper end of the first leg and a second closed loop coupled directly to an upper end of the second leg, wherein the first closed loop and the second closed loop form a substantially flat frame that spans substantially completely between the first leg and the second leg, wherein the substantially flat frame is substantially orthogonal to a lengthwise extension of the first and second legs, and wherein the lateral portion comprises a member that is common to both of the first and second closed loops.

2. The infant safety seat of claim 1, wherein the member comprises a handgrip positioned between the first leg and the second leg.

3. The infant safety seat of claim 2,
    wherein the member runs substantially parallel to the first sidewall and the second sidewall.

4. The infant safety seat of claim 3, wherein at least of portion of an inner surface of the first loop comprises a planar surface.

5. The infant safety seat of claim 1, wherein:
the first closed loop comprises a first semicircular portion that extends from a first point on the lateral portion of the handle, the first semicircular portion comprising a first end that extends towards the second sidewall; and
the second closed loop comprises a second semicircular portion that extends from a second point on the lateral portion of the handle, the second semicircular portion comprising a second end that extends towards the first sidewall.

6. The infant safety seat of claim 5, wherein:
the first semicircular portion extends from the first point towards a front portion of the seat shell; and
the second semicircular portion extends from the second point towards a rear portion of the seat shell.

7. The infant safety seat of claim 6, wherein the lateral portion of the handle further comprises a handgrip positioned between the first end and the second end, and wherein the handgrip has a length that runs substantially parallel to the first sidewall and the second sidewall.

8. The infant safety seat of claim 5, wherein:
the first semicircular portion extends from the first end of the lateral portion of the handle in a first direction; and
the second semicircular portion extends from the second end of the lateral portion of the handle in the first direction.

9. The infant safety seat of claim 8, wherein the lateral portion of the handle further comprises a handgrip positioned between the first end and the second end, and wherein the handgrip has a length that runs substantially perpendicular to the first sidewall and the second sidewall.

10. The infant safety seat of claim 1, wherein the lateral portion comprises a substantially figure eight configuration.

11. The infant safety seat of claim 1, wherein the first sidewall further comprises an additional opening located between the opening and the first leg, the additional opening configured to provide an additional handhold.

12. The infant safety seat of claim 1, wherein the opening included in the first sidewall is located nearer to a lower surface of the first sidewall than the first leg.

13. The infant safety seat of claim 1, wherein an inner surface of the opening is wider at a first location than at a second location, the first location above the second location.

14. The infant safety seat of claim 1, further comprising:
a tubular member extending between a first point on the first sidewall and a second point on the first sidewall, wherein the tubular member is configured to provide an additional handhold.

15. An infant safety seat, comprising:
a seat shell comprising a first sidewall and a second sidewall opposite to the first sidewall, the first sidewall including an opening configured to provide a handhold; and
a handle comprising:
a first leg coupled with the first sidewall of the seat shell and a second leg coupled with the second sidewall of the seat shell; and
a lateral portion coupled with the first leg and the second leg, the lateral portion comprising a first J-shaped hook structure having a first curved portion that opens inwardly toward a center of the lateral portion and has a first free end and a second J-shaped hook structure having a second curved portion that opens inwardly toward the center of the lateral portion and has a second free end.

16. The infant safety seat of claim 15, wherein the handle further comprises a member between the first J-shaped hook structure and the second J-shaped hook structure, wherein the member runs substantially parallel to the first sidewall and the second sidewall.

* * * * *